C. T. CHESTER.
Carbon Plate for Galvanic Batteries.
No. 38,146. Patented Apr. 14, 1863.
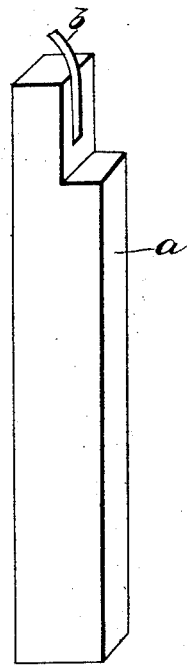

UNITED STATES PATENT OFFICE.

CHARLES T. CHESTER, OF NEW YORK, N. Y.

IMPROVED CARBON PLATES FOR GALVANIC BATTERIES.

Specification forming part of Letters Patent No. 38,146, dated April 14, 1863.

*To all whom it may concern:*

Be it known that I, CHARLES T. CHESTER, of the city and county of New York, and State of New York, have invented a new and useful Improvement in Galvanic Batteries; and I do hereby declare that the following is a full and correct description thereof, reference being had to the annexed drawings, making a part of this specification, and to the letters of reference thereon.

My said invention relates to batteries wherein carbon elements are used; and it consists in combining with the carbon element an embedded platina or gold connection.

The process of manufacture of artificial carbon for electrical purposes is well known and described in books and patents. It consists of the formation of carbonaceous materials—such as lamp-black, the residuum of gas-retorts, graphite, &c.—into a plastic compound, with sugar, gas-tar, or any substance which will consolidate the particles of carbon and become itself carbonized by heat. The plastic carbon may be placed in molds which separate into two parts. In one of these parts the platina strip is laid at one end upon the plastic compound, and that part of it which is intended to project from the finished plate may be either bent down at right angles to the axis of the plate or it may be received into a recess left for it in the mold. The two parts of the mold are now brought together and pressure applied in any suitable manner, according to the shape of the molds, to increase the density of the mass. Before receiving their charge of plastic carbon the molds are lined with paper, chalk, or plaster-of-paris, and small orifices left to allow of the absorption and expulsion of the generated gases during the baking process.

The object of embedding the platinum or gold connection in the carbon element is to get a large and perfect surface of contact with the connection. The more oxidizable metals are unfit for this mode of connection. The oxidation on their surfaces not only destroys connection but bursts the carbon plates asunder.

The drawing represents a carbon element, $a$, with a portion of the end removed, so as to show the embedded platinum connection $b$.

I prefer to use a thin or flat strip of platinum or gold; but the connection may be made by means of an embedded wire of gold or platinum or a plate or wire sufficiently covered with gold or platinum to keep up a perfect connection. When the connection is made by embedding a short strip of platinum or gold in the carbon, which is most convenient in the process of manufacturing the carbon, I unite the wire employed in completing the connection with the zinc to the embedded strip by solder, taking care to drive the wire firmly into the carbon to secure strength, and to coat its surface where thus driven in with gold or platinum.

Now, it is evident that the platinum or gold connection may be combined with the carbon element by embedding and baking in plastic carbon material in various ways without essentially changing the resulting element or the mode of manufacture, as, for instance, a hole bored in a carbon element and the platinum or gold connection inserted in plastic carbon material contained therein, and then baked; and I do not herein wish to be considered as limiting myself to any particular mode of carrying out my invention.

I claim—

In combination with a carbon element of a galvanic battery, a gold or platinum connection embedded in the carbon during the process of manufacture of the carbon element, substantially as described.

CHARLES T. CHESTER.

Witnesses:
RICHARD J. CUNNINGHAM,
P. JAMES GAGE.